(12) United States Patent
Martinez

(10) Patent No.: US 9,632,317 B2
(45) Date of Patent: Apr. 25, 2017

(54) IMAGE PROJECTION DEVICE

(71) Applicant: Commissariat à l'énergie atomique et aux énergies alternatives, Paris (FR)

(72) Inventor: Christophe Martinez, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 36 days.

(21) Appl. No.: 14/743,628

(22) Filed: Jun. 18, 2015

(65) Prior Publication Data

US 2015/0370073 A1 Dec. 24, 2015

(30) Foreign Application Priority Data

Jun. 24, 2014 (FR) .................... 14 55845

(51) Int. Cl.
| | | |
|---|---|---|
| G02B 27/00 | (2006.01) | |
| G02B 27/01 | (2006.01) | |
| G02F 1/313 | (2006.01) | |
| F21V 8/00 | (2006.01) | |
| G02B 5/18 | (2006.01) | |

(52) U.S. Cl.
CPC .......... *G02B 27/0172* (2013.01); *G02B 5/18* (2013.01); *G02B 6/0011* (2013.01); *G02B 6/0036* (2013.01); *G02F 1/313* (2013.01); *G02B 2027/0105* (2013.01); *G02B 2027/015* (2013.01); *G02B 2027/0118* (2013.01); *G02B 2027/0123* (2013.01); *G02F 2201/305* (2013.01)

(58) Field of Classification Search
CPC .... G02B 27/0172; G02B 5/18; G02B 6/0011; G02B 6/0036; G02B 2027/015; G02B 2027/0123; G02B 2027/0118; G02B 2027/0105; G02F 1/313; G02F 2201/305
See application file for complete search history.

(56) References Cited

U.S. PATENT DOCUMENTS

| | | | |
|---|---|---|---|
| 5,106,181 A | 4/1992 | Rockwell, III | |
| 5,852,688 A | 12/1998 | Brinkman | |
| 8,233,204 B1 * | 7/2012 | Robbins | G02B 5/1828 345/7 |
| 2014/0043320 A1 | 2/2014 | Tosaya | |
| 2014/0204455 A1 | 7/2014 | Popovich et al. | |

FOREIGN PATENT DOCUMENTS

| | | |
|---|---|---|
| DE | 102004050418 A1 | 5/2006 |
| WO | 2013027004 A1 | 2/2013 |

OTHER PUBLICATIONS

European Patent Office, Search Report, Nov. 5, 2015, Munich.
(Continued)

*Primary Examiner* — Joseph P Martinez
(74) *Attorney, Agent, or Firm* — Kevin R. Erdman; Brannon Sowers & Cracraft PC

(57) ABSTRACT

An image projection device, including: at least one waveguide formed in a substrate; and at least one extraction device including a plurality of extraction cells coupled to different areas of the guide, each cell being capable of being electrically activated to extract light from the guide and project this light along a predetermined projection direction, wherein different extraction cells have projection directions with different orientations.

20 Claims, 6 Drawing Sheets

(56) References Cited

OTHER PUBLICATIONS

Institut National De La Propriete Industrielle, "Raport De Recherche Preliminaire" (Preliminary Search Report) for French Patent Application Serial No. 14/55845, dated Mar. 12, 2015.
Buss, Thomas, Smith, Cameron L. C., and Kristensen, Anders, "Electrically modulated transparent liquid crystal-optical grating projection", Jan. 16, 2013, pp. 1820-, vol. 21, No. 2, Optics Express, USA.

* cited by examiner

IMAGE PROJECTION DEVICE

CROSS-REFERENCE TO RELATED APPLICATIONS

The present application claims priority under 35 U.S.C. §119 of French Patent Application Serial Number 14/55845, filed Jun. 24, 2014, and European Patent Application Serial Number 15172608.0, filed Jun. 17, 2015, the disclosures of which are incorporated by reference herein.

BACKGROUND

The present disclosure relates to an image projection device. It especially relates to a projection device capable of being used in an image display device in augmented reality intended to be worn on the head, without however being limited to this specific field of application.

DISCUSSION OF RELATED ART

Augmented reality image display comprises super-imposing, to an image of the real world, an image containing additional information for an observer, for example, information relative to his/her environment, position, displacement speed, etc.

Augmented reality image display devices intended to be worn on the head are generally designated with acronym HMD, for "Head Mounted Display". Such devices may comprise a beam splitter placed a few millimeters or centimeters away from a user's eye, and inclined by 45 degrees with respect to the eye's mean optical axis, through which the user can see a real scene in transparency. A miniaturized projection device enables to display information on the beam splitter, so that this information is perceived by the user as being integrated to the real scene seen through the beam splitter. Existing devices however have various disadvantages, particularly their significant bulk, as well as their relatively low light output and the relatively limited angular field of the projection device.

SUMMARY

An object of an embodiment is to provide an image projection device overcoming all or part of the disadvantages of existing projection devices, such a device being in particular capable of being used in an augmented reality image display device intended to be worn on the head, or capable of being used for other applications.

Thus, an embodiment provides an image projection device, comprising: at least one waveguide formed in a substrate; at least one laser emission source of controllable intensity configured to inject into the waveguide a laser beam of constant orientation; and at least one extraction device comprising a plurality of extraction cells coupled to different areas of the guide, each cell corresponding to a single pixel of the image and being capable of being electrically activated to extract light from the guide and project the light along a predetermined projection direction, wherein different extraction cells have projection directions with different orientations.

According to an embodiment, each extraction cell comprises: a diffraction grating coating a portion of a surface of the guide; a layer having an electrically-controllable refraction index covering the grating; and at least one electrode for controlling the refraction index of said layer.

According to an embodiment, diffraction gratings of different extraction cells have different pitches or different orientations relative to a longitudinal direction of the guide.

According to an embodiment, each extraction cell comprises a holographic element superimposed to the layer of controllable refraction index, capable of orienting, in the projection direction of the cell, light extracted from the guide by the diffraction grating of the cell.

According to an embodiment, the diffraction gratings of the different cells have the same pitch and the same orientation relative to a longitudinal direction of the guide.

According to an embodiment, the projection device comprises a plurality of waveguides formed in the substrate, a plurality of laser emission sources, and a plurality of extraction devices, each waveguide being coupled to one of the laser emission sources and to one of the extraction devices.

According to an embodiment, the different extraction devices all have the same number of extraction cells, and the cells of same rank of the different extraction devices have their control electrodes connected, the rank of an extraction cell corresponding to its positioning order, with respect to the other cells of the same extraction device, between first and second ends of the guide having the extraction device coupled therewith.

According to an embodiment, a plurality of waveguides are optically connected, that is, they are capable of being supplied with light from a same light source.

According to an embodiment, a plurality of extraction cells coupled to different optically-connected waveguides have parallel projection directions.

According to an embodiment, in each extraction device, a plurality of extraction cells are electrically connected, these cells having parallel projection directions.

According to an embodiment, the extraction cells are irregularly distributed across the surface of the device.

According to an embodiment, the laser beam of constant orientation is a beam of rays substantially parallel to the longitudinal direction of the waveguide into which it is injected.

According to an embodiment, in transverse cross-section, the largest dimension of the waveguide is smaller than or equal to 2 μm.

According to an embodiment, the emission surface area of each of the extraction cells is smaller than or equal to 5 μm2.

The foregoing and other features and advantages will be discussed in detail in the following non-limiting description of specific embodiments in connection with the accompanying drawings.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1A:
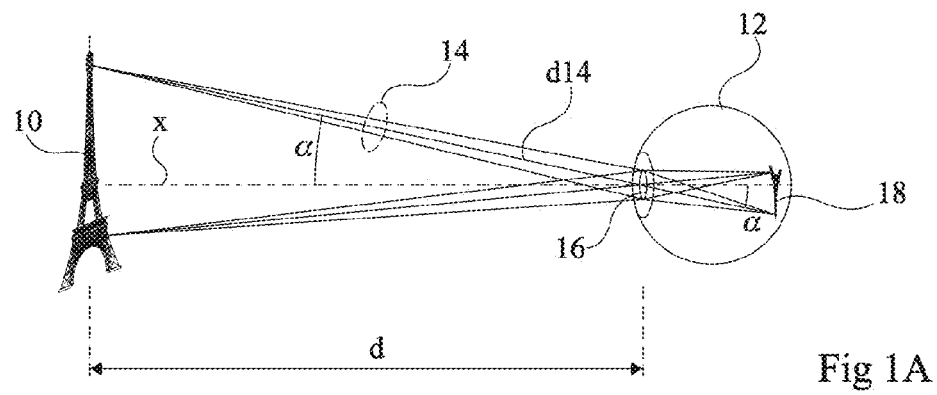
FIGS. 1A and 1B schematically illustrate optical principles of vision conditioning the perception of a scene by an observer.

Corresponding reference characters indicate corresponding parts throughout the several views. Although the drawings represent embodiments of the present invention, the drawings are not necessarily to scale and certain features may be exaggerated in order to better illustrate and explain the present invention. The circuit diagrams and related depictions are also representative in nature, and actual embodiments of the invention may include further features or steps not shown in the drawings. The exemplification set out herein illustrates embodiments of the invention, in several forms, and such exemplifications are not to be construed as limiting the scope of the invention in any manner.

DETAILED DESCRIPTION

For clarity, the same elements have been designated with the same reference numerals in the various drawings and, further, the various drawings are not to scale. Further, in the following description, unless otherwise indicated, terms "approximately", "substantially", "around", "almost", and "in the order of" mean "to within 10%", or when referring to angular references or the like, to within 5 degrees, and terms referring to directions, such as "lateral", "under", "above", "upper", "lower", "topping", etc. apply to devices arranged as illustrated in the corresponding views, it being understood that, in practice, the devices may have different directions.

Figure 1B:
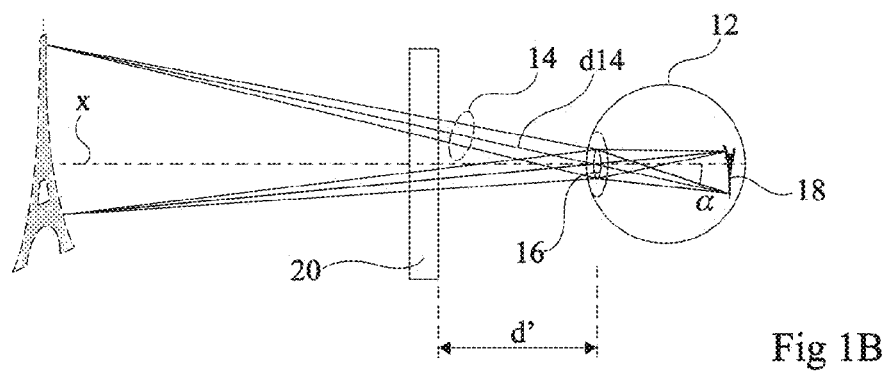

FIGS. 1A and 1B schematically illustrate optical vision mechanisms conditioning the perception of a scene by an observer.

FIG. 1A illustrates the path of the light rays between a real object 10 and an observer's eye 12.

As appears in the drawing, each point of object 10 generates a beam 14 of light rays captured by pupil 16 of the eye. Beam 14 is focused by the eye on a point of retina 18. The angle of vision α of a point of object 10 is the angle formed between main optical axis X of the sight and main direction d14 of beam 14 emitted by the object point—that is, the direction running through the object point and the optical center of the eye (point through which the incoming rays are not deviated). Angle α determines the size of the image of the object formed on the retina.

Further, term "accommodation" is used to designate the physiological modifications enabling eye 12 to ensure the sharpness of the images formed on retina 18 for different viewing distances d between object 10 and eye 12. As an example, if distance d is long enough, the rays of beams 14 emitted by a point of object 10 may be considered as being parallel. However, if distance d is short, beam 14 may have a certain angle of divergence. The human eye is naturally capable, by physiological modifications, and particularly by the deformation of the eye-lens, of accommodating to ensure the sharpness of the image formed on the retina for different distance d, that is, to ascertain that the image of a point of object 10 is always a point or considered as such. The sensation of accommodation particularly enables the observer to estimate the size of the object in relation with the angle of vision of the object. In particular, it enables the observer to discriminate an object of small size located close to the eye from an object of larger size located at a greater distance from the eye.

As illustrated in FIG. 1B, if the vision of a scene by means of a projection device 20 located at an arbitrary distance d' from the eye is desired to be artificially generated, it is desirable for device 20 to be adapted to generating light beams 14' substantially of same angular orientation α and of same degree of divergence as beams 14 emitted by the points of the real object, to give the illusion of the two above-mentioned effects of angle of vision and of accommodation to a desired distance d.

Existing projection devices generally comprise an imager capable of forming an artificial image of the object in a display plane located outside of the eye (for example, an array of luminous display pixels or a device capable of projecting an image on a diffusing screen), and an optical system located between the display screen and the eye, capable of structuring the artificial image of the object to give the illusion of the above-mentioned effects of angle of vision and of accommodation.

According to an aspect of the described embodiments, an image projection device which does not comprise an imager in the traditional sense, that is, an imager capable of generating an artificial image of a scene in a plane located outside of the eye, is provided herein. More particularly, a projection device capable of forming an image directly on the observer's retina is here provided, by an appropriate set of laser emissions.

Figure 2:
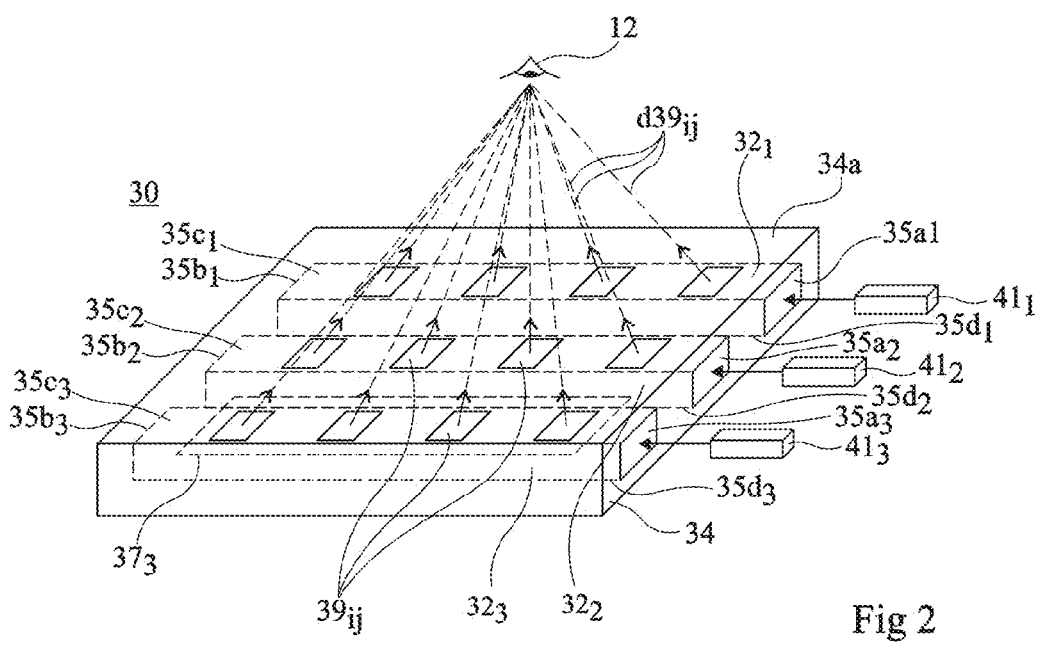
FIG. 2 is a perspective view schematically illus-trating an embodiment of an image projection device.

FIG. 2 is a perspective view schematically and partially illustrating an embodiment of an image projection device 30.

Projection device 30 comprises N optical waveguides $32_i$ formed in a transparent substrate 34, for example, a glass substrate, where N is an integer greater than or equal to 1 and i is an integer in the range from 1 to N. In the shown example, N is equal to 3. The described embodiments are however not limited to this specific case. In this example, each waveguide $32_i$ has the shape of a rectilinear band extending in the longitudinal direction of the guide between first and second ends $35a_i$ and $35b_i$ of the guide, and the different guides $32_i$ are substantially identical and parallel to one another. As an example, in transverse cross-section, the largest dimension of each of waveguides $32_i$ does not exceed 2 μm. In this example, waveguides $32_i$ are located in a same median plane approximately parallel to a surface 34a of substrate 34, that is, each guide has its main surfaces $35c_i$ and $35d_i$ or surfaces of greatest surface area, approximately parallel to surface 34a of the substrate, surfaces $35c_i$ of the different guides on the one hand and surfaces $35d_i$ of the different guides on the other hand being approximately coplanar. Reference $35c_i$ here designates the main surface of guide $32_i$ closest to surface 34a of the substrate, and reference $35d_i$ designates the main surface of guide $32_i$ most remote from surface 34a of the substrate. In this example, end surfaces $35a_i$ of the different guides on the one hand and end surfaces $35b_i$ of the different guides on the other hand are substantially coplanar, orthogonal to surface 34a of the substrate, and orthogonal to the longitudinal direction of the guides.

Projection device 30 further comprises N light extraction devices $37_i$, each extraction device $37_i$ being coupled to the waveguide $32_i$ of same index i via main surface $35c_i$ of the guide. Each light extraction device $37_i$ comprises M extraction cells $39_{ij}$ coupled to different areas of surface $35c_i$ of guide $32_i$, where M is an integer greater than or equal to 2 and j is an integer in the range from 1 to M. In the shown example, M is equal to 4. The described embodiments are however not limited to this specific case. In this example, in each extraction device $37_i$, cells $39_{ij}$ are arranged at a regular interval substantially along the entire length of the corresponding guide $32_i$, by order of increasing index j between end $35a_i$ and end $35b_i$ of the guide. In this example, extraction cells $39_{ij}$ of same index or rank j are aligned along a direction approximately orthogonal to the longitudinal direction of the guides. Each cell $39_{ij}$ may be electrically activated and is capable, when activated, of extracting light propagating in guide $32_i$ and of projecting this light towards the outside of device 30 along a predetermined direction $d39_{ij}$. When a cell $39_{ij}$ is deactivated, it has no effect on the light flowing in guide $32_i$.

According to an aspect of the described embodiments, in each extraction device $37_i$, different extraction cells $39_{ij}$ have projection directions $d39_{ij}$ having different orientations relative to surface $35c_i$ of the corresponding guide $32_i$. In the shown example, the orientations of projection directions $d39_{ij}$ of extraction cells $39_{ij}$ relative to upper surface 34a are all different from one another. Projection device 30 is intended to be positioned in front of an observer so that the beams projected by the different extraction cells $39_{ij}$ all reach the pupil of an eye 12 of the observer.

Projection device 30 further comprises N laser emission sources $41_i$ having individually controllable intensities. Each laser source $41_i$ is capable of injecting into the guide $32_i$ of same rank i a monochromatic or polychromatic light beam of constant orientation capable of propagating in the guide, for example, a beam of rays substantially parallel to the longitudinal direction of guide $32_i$. In the shown example, each laser source $41_i$ is coupled to the guide $32_i$ of same rank i via end $35a_i$ of this guide.

Protection device 30 operates as follows. During the projection of an image, the N laser sources $41_i$ are supplied and, in each extraction device $37_i$, extraction cells $39_{ij}$ are successively activated by a control circuit (not shown) to project, in the different projection directions $d39_{ij}$ of extraction device $37_i$, light emitted by the corresponding source $41_i$. On activation of a cell $39_{ij}$, the control circuit controls the emission power of the corresponding laser source $41_i$, to modulate the light intensity emitted by device 30 according to the projection angle. Each extraction cell $39_{ij}$, when it is activated, projects a light beam corresponding to a pixel of the image. The orientation of the projection direction $d39_{ij}$ of each cell $39_{ij}$ is selected according to the angle of vision desired for the corresponding pixel. Device 30 of FIG. 2 is thus capable of projecting an image of N*M pixels. In this example, in each extraction device $37_i$, a single extraction cell $39_{ij}$ is activated at a time. Extraction cells $39_{ij}$ of same rank j of the different extraction devices $37_i$ may for example be simultaneously activated to project the image line by line.

Figure 3A:
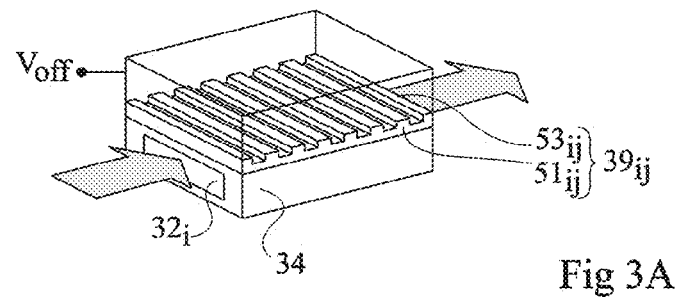
FIGS. 3A and 3B are partial perspective views illustrating in more detailed fashion, in two operating configurations, an embodiment of the projection device of FIG. 2.
Figure 3B:
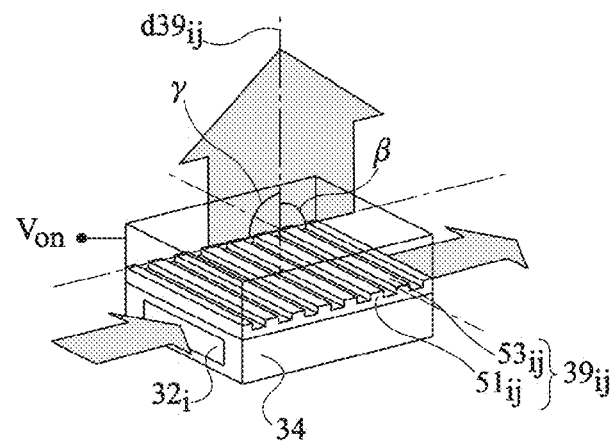

FIGS. 3A and 3B are perspective views illustrated in more detailed fashion a portion of an embodiment of projection device 30 of FIG. 2 in two different operating configurations. More particularly, FIGS. 3A and 3B show a portion of a waveguide $32_i$ of device 30 and an embodiment of an extraction cell $39_{ij}$ coupled to this waveguide. FIG. 3A shows cell $39_{ij}$ in the inactive state, and FIG. 3B shows cell $39_{ij}$ in the active state.

In the example of FIGS. 3A and 3B, extraction cell $39_{ij}$ comprises a diffraction grating $51_{ij}$ coupled to guide $32_i$, by an area of its surface $35c_i$. Diffraction grating $51_{ij}$ is essentially formed by a structure made of transparent material comprising a first planar surface in contact with surface $35c_i$ of the guide, and a second surface opposite to the first one, which surface comprises regularly spaced-apart parallel grooves, for example, approximately orthogonal to the longitudinal direction of guide $32_i$. Diffraction grating $51_{ij}$ may be formed in the material of substrate 34 on the side of surface 34a of the substrate if waveguide $32_i$, is buried under surface 34a of the substrate. As a variation, diffraction grating $51_{ij}$ may comprise a grooved layer made of a transparent material coating surface 34a of the substrate.

Cell $39_{ij}$ further comprises a layer $53_{ij}$ made of a transparent material coating the grooved surface of diffraction grating $51_{ij}$, and having an approximately planar surface opposite to the grooved surface of grating $51_{ij}$. Layer $53_{ij}$ is made of a material having a refraction index which may be electrically controlled by application of a bias voltage. Layer $53_{ij}$ is for example a liquid crystal layer. Cell $39_{ij}$ further comprises electrodes enabling to apply a bias voltage to layer $53_{ij}$ to modify its refraction index. For clarity, these electrodes have not been shown in FIGS. 3A and 3B. As an example, the grooved layer of diffraction grating $51_{ij}$ may be made of an electrically-conductive material, for example, of indium-tin oxide (ITO), and be used as an electrode for the application of a bias voltage to layer $53_{ij}$. A second approximately planar transparent electrode, for example, made of ITO, may coat the planar surface of layer $53_{ij}$. Other layouts of the electrodes for biasing layer $53_{ij}$ may however be provided. As an example, the electrodes may be arranged on the lateral surfaces of layer $53_{ij}$.

When an adapted bias voltage $V_{off}$ (FIG. 3A), for example, equal to 0 V, is applied to layer $53_{ij}$, the refraction index of layer $53_{ij}$ is identical or almost identical to that of the grooved layer of grating $51_{ij}$, which causes the deactivation of the optical diopter formed between the grooved surface of grating $51_{ij}$ and layer $53_{ij}$. Cell $39_{ij}$ then is in a state which is here called inactive state, that is, the laser beam guided by waveguide $32_i$, when it crosses the coupling area between guide $32_i$ and cell $39_{ij}$, is not disturbed by cell $39_{ij}$ and keeps on propagating in the guide all the way to the next extraction cell.

When an adapted bias voltage Von (FIG. 3B), different from $V_{off}$, is applied to layer $53_{ij}$, the refraction index of layer $53_{ij}$ is modified, which causes the activation of the diopter formed between the grooved surface of grating $51_{ij}$ and layer $53_{ij}$. Cell $39_{ij}$ then is in a state which is here called active state, that is, the laser beam guided by waveguide 32i interacts with grating $51_{ij}$ when it crosses the coupling area between guide $32_i$, and cell $39_{ij}$. Part of the guided wave is then extracted from the guide, and is projected along a direction forming an angle β (in the order of 90 degrees in the shown example) with the longitudinal direction of the guide.

For a given wavelength of the guided light, angle β particularly depends on the pitch of grating $51_{ij}$ of the cell. Further, the projection direction of the light extracted by the cell forms an angle γ (in the order of 90 degrees in the shown example) with the transverse direction of the guide. Angle γ particularly depends on the orientation of the grooves of grating $51_{ij}$.

In an embodiment of the projection device of FIG. 2, gratings $51_{ij}$ of the different extraction cells $39_{ij}$ of the device have different pitches and/or different orientations relative to the longitudinal direction of the guide, which enables to obtain the different desired orientations of projection directions $d39_{ij}$ of cells $39_{ij}$.

Figure 4:
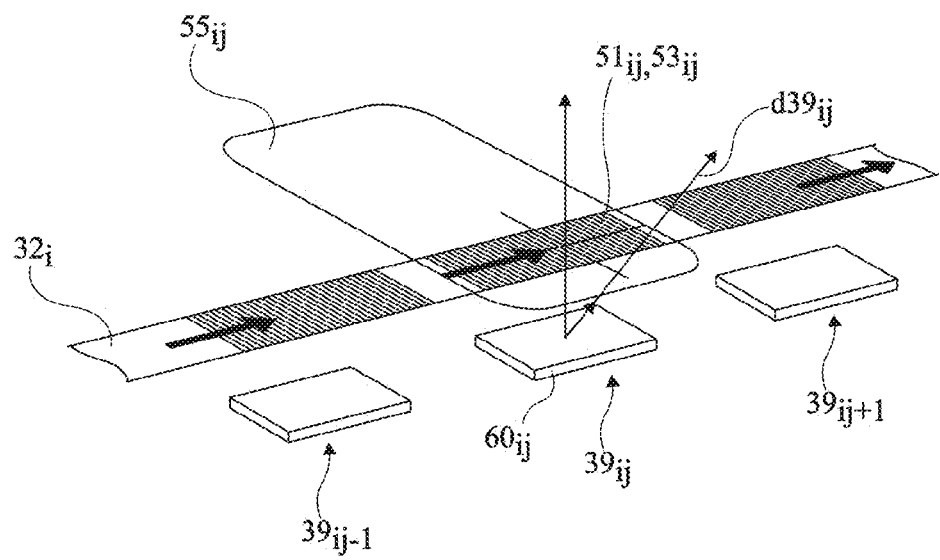
FIG. 4 is a partial perspective view illustrating in more detailed fashion another embodiment of the projection device of FIG. 2.

FIG. 4 is a perspective view schematically and partially illustrating another embodiment of the projection device of FIG. 2. More particularly, FIG. 4 shows a portion of a waveguide $32_i$ of device 30, and three extraction cells $39_{ij-1}$, $39_{ij}$ and $39_{ij+1}$ coupled to different areas of surface $35c_i$ of guide $32_i$.

In the example of FIG. 4, each extraction cell $39_{ij}$ comprises the same elements as in the example of FIGS. 3A and 3B, that is, a diffraction grating $51_{ij}$ coupled to guide $32_i$ by an area of its surface $35c_i$, a layer $53_{ij}$ having an electrically-controllable refraction index, coating the grooved surface of grating $51_{ij}$, and at least one electrode $55_{ij}$ for controlling the refraction index of layer $53_{ij}$, or cell activation/deactivation electrode. For simplification, only one control electrode $55_{ij}$ of cell $39_{ij}$ has been shown in FIG. 4.

A difference between the embodiment of FIGS. 3A and 3B and the embodiment of FIG. 4 is that, in the example of FIG. 4, gratings $51_{ij}$ of the different extraction cells $39_{ij}$ of the projection device are all substantially identical, that is, they all have the same pitch and the same orientation relative to the longitudinal direction of the guide. Thus, in the example of FIG. 4, the light projection directions at the output of gratings $51_{ij}$ of the different cells $39_{ij}$ all substantially have the same orientation relative to surfaces $35c_i$ of the guides. In the shown non-limiting example, the light projection direction at the output of gratings $51_{ij}$ is approximately orthogonal to the plane of surfaces $35c_i$ of the guides.

In the embodiment of FIG. 4, each cell $39_{ij}$ further comprises a holographic element $60_{ij}$ arranged opposite the layer of variable index $53_{ij}$, on the path of the light extracted from the guide by grating $51_{ij}$ when the cell is in the active state. Holographic element $60_{ij}$ is capable of directing the light beam extracted from guide $32_i$ in the projection direction $d39_{ij}$ desired for cell $39_{ij}$. In the case of projection device 30 of FIG. 2, holographic elements $60_{ij}$ of the different cells $39_{ij}$ all have different orientation properties. In the example shown in FIG. 4, holographic orientation elements $60_{ij}$ are reflective orientation elements. As a variation, transmissive holographic orientation elements may be used.

An advantage of the embodiment of FIG. 4 is due to the fact that diffraction gratings $51_{ij}$ of the projection device are all substantially identical, which makes them easier to form. An example of a method of manufacturing holographic orientation elements $60_{ij}$ of the device of FIG. 4 will be described hereafter in relation with FIGS. 9A and 9B.

As a non-limiting sizing example, waveguides $32_i$, may be guides having a refraction index in the order of 1.52, formed in a substrate 34 having an index in the order of 1.5, and having a width of approximately 800 nm and a thickness of approximately 500 nm. Sources $41_i$, are for example capable of emitting a laser beam at a wavelength in the order of 650 nm. In the embodiment of FIG. 4, diffraction gratings $51_{ij}$ may have a pitch of approximately 430 nm. The surface area of the emission region of each of extraction cells $39_{ij}$ is for example in the range from 1 to 20 µm2.

The inventors have observed that, for certain sizings of the projection device, particularly when the emission regions of extraction cells $39_{ij}$ of the projection device have a small size, for example, when they have a surface area smaller than or equal to 5 µm2, the beams projected by the different extraction cells $39_{ij}$ of the device may have a non-negligible angle of divergence that the eye may be incapable of accommodating. In this case, the image on the retina of a light beam projected by an extraction cell $39_{ij}$ of the device will not be a point, but a relatively large spot that the observer will perceive as a fuzzy halo.

Figure 5A:
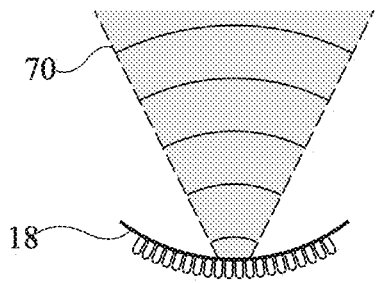
FIGS. 5A to 5C are diagrams illustrating the behavior in an observer's eye of different types of light beams.
Figure 5A:
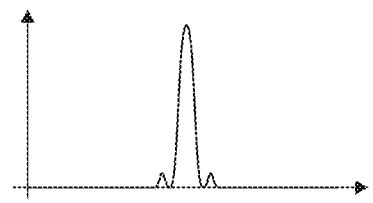
Figure 5B:
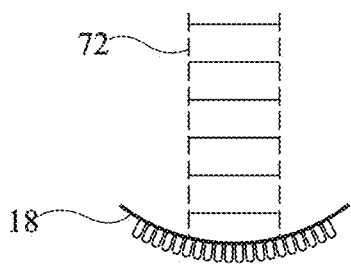
Figure 5B:
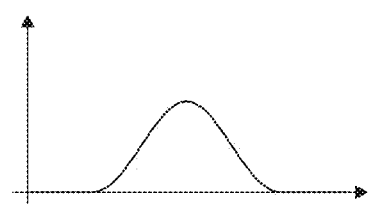
Figure 5C:
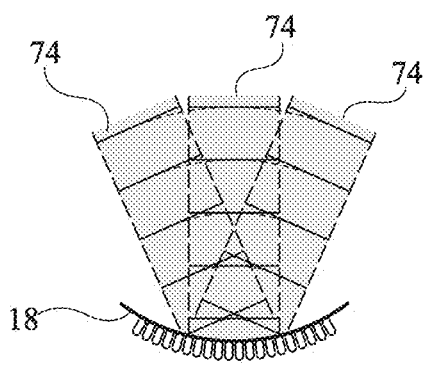
Figure 5C:
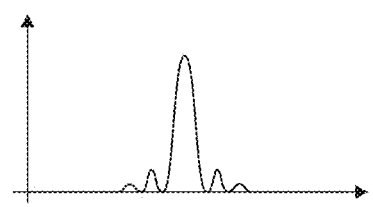

FIGS. 5A to 5C illustrate this phenomenon as well as an example of a solution that may be implemented so that the user can perceive sharp images even when the emission regions of the extraction cells of the projection device are small.

FIG. 5A shows the shape taken, inside of the eye, by a light beam 70 originating from a point of an object on which the eye is capable of accommodating its vision, for example, a point of an object located at infinity. FIG. 5A further shows, in the form of a diagram, the spatial distribution of the light energy of beam 70 received by retina 18 in the background of the eye. As appears in the drawing, the eye transforms the wavefront of the incident beam (which is for example a planar wavefront in the case of an object located at infinity) into a circular wavefront centered on a point of retina 18. The energy of beam 70 is then concentrated on a point or a point-like area of retina 18. The observer thus effectively perceives a point. Angle of vision α (see FIG. 1A) of the incident beams determines the position of this point (or center of convergence of the circular wavefront) on the retina.

FIG. 5B shows the shape taken, inside of the eye, by a light beam 72 having an angle of divergence that the eye is not capable of accommodating, for example, a diverging light beam emitted by an extraction cell $39_{ij}$ of a projection device of the type described in relation with FIGS. 2 to 4 when the emission surface area of this cell is small. FIG. 5B further shows the spatial distribution of the light energy of beam 72 received by retina 18 in the eye background. The eye transforms the wavefront of the incident beam (which for example is a circular wavefront centered on the beam emission source) into a planar wavefront or into a circular wavefront centered on a point located behind retina 18—that is, on the side of retina 18 opposite to the pupil. The energy of beam 72 is thus then distributed in a relatively wide area of retina 18. The observer thus does not perceive a point, but rather a fuzzy halo having its position on the retina determined by angle of vision α of the emission point.

FIG. 5C illustrates a solution which may be implemented to restore, inside of the eye, the illusion of a circular wavefront centered on a point of the retina, from a plurality of beams each having, outside of the eye, a relatively large angle of divergence, for example, beams emitted by extraction cells having a small emission surface area of a projection device of the type described in relation with FIGS. 2 to 4. In this example, a plurality of diverging light beams 74 corresponding to a same pixel of the image to be displayed are simultaneously emitted towards the eye, from different areas of the projection device (that is, by different extraction cells of the device), with parallel projection directions converging on a same point of the retina. FIG. 5C shows the shape taken, inside of the eye, by each of beams 74. FIG. 5C further shows the spatial distribution of the light energy of beams 74 received by retina 18 at the back of the eye. As appears in the drawing, the eye transforms the wavefront of each beam 74 (which for example is a circular wavefront centered on the beam emission source) into a planar wavefront or into a circular wavefront centered on a point located behind retina 18. If the different beams 74 are coherent and properly phase-matched, the wavefronts constructively interfere at the point of convergence located on retina 18. A multiple interference focusing effect is thus obtained. The energy of beams 74 is thus concentrated on a point or a point-like area of retina 18. In other words, by multiplying beams 74, it is possible to restore, inside of the eye, an assembly of wavefronts which takes a circular wavefront shape of the type described in relation with FIG. 5A. The observer then perceives a point having its position on the retina depending on the orientation of the incident beams.

Figure 6:
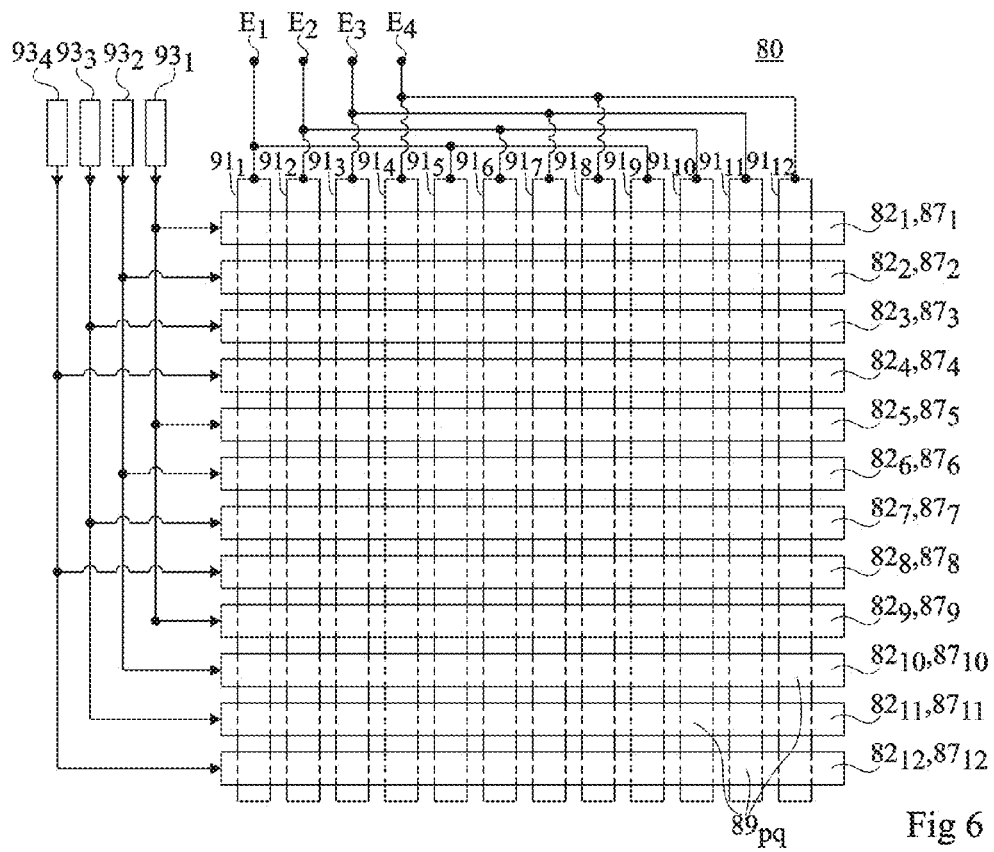
FIG. 6 is a top view schematically illustrating an embodiment of an image projection device.

FIG. 6 is a top view schematically illustrating an embodiment of an image projection device 80 capable of implementing an operation of the type described in relation with FIG. 5C. Projection device 80 is capable of projecting an image of N*M pixels. In the shown non-limiting illustrative example, N=M=4.

Projection device 80 comprises k*N optical waveguides $82p$ formed in a transparent substrate (not shown), where k is an integer greater than or equal to 2 and p is an integer in the range from 1 to k*N. In the shown example, k is equal to 3. Waveguides $82p$ of projection device 80 of FIG. 6 for example substantially have the same rectilinear band shape as guides $32_i$, of the device of FIG. 2, and may be arranged substantially in the same way (that is, parallel to one another, aligned, arranged in a same median plane and regularly distributed along a direction orthogonal to the guide length). As an example, in transverse cross-section the largest dimension of each of waveguides $82p$ does not exceed 2 µm.

Projection device 80 further comprises k*N light extraction devices $87_p$, each extraction device $87_p$ being coupled to the waveguide $82_p$ of same index p. Each extraction device $87_p$ comprises 1*M extraction cells $89_{pq}$ capable of being electrically activated/deactivated, coupled to different areas of guide $82_p$, where l is an integer greater than or equal to 2 and q is an integer in the range from 1 to 1*M. In the shown example, 1 is equal to 3. Extraction cells $89_{pq}$ for example are cells of the type described in relation with FIGS. 3A, 3B, or 4. In this example, the cells $89_{pq}$ of a same extraction device $87_p$ are regularly distributed along the corresponding guide $82_p$, and the cells $89_{pq}$ of same rank q are aligned along a direction orthogonal to the length of guides $82_p$. In the shown example, the cells $89_{pq}$ of same rank q are capable of being simultaneously activated or deactivated via a same control electrode $91_q$, to allow a line-by-line display of the images. Each cell $89_{pq}$ is capable, when activated, of extracting light propagating in guide $82_p$ and of projecting this light towards the outside of the device in a predetermined direction $d89_{pq}$ (not shown in FIG. 6). When a cell $89_{pq}$ is deactivated, it has no effect upon the light circulating in guide $82_p$.

Projection device 80 further comprises N laser emission sources $93_i$ having a controllable intensity, each laser source $93_i$ being coupled to k waveguides selected from among the k*N waveguides $82_p$ of the device. Each laser source $93_i$ is capable of simultaneously injecting, into the k waveguides to which it is coupled, a light beam of constant orientation capable of propagating in these guides. In the shown example, the k waveguides coupled to a same laser source $93_i$ are arranged at a regular interval all along the dimension of device 80 orthogonal to the length of the guides. More particularly, in the shown example, the k waveguides coupled to a same laser source $93_i$ are guides $82_i$, $82_{i+k}$, . . . , $82_{i+s*k}$, s being an integer such that i+s*k≤k*N.

Further, in projection device 80 of FIG. 6, each extraction device $87_p$ comprises M groups of 1 connected extraction cells $89_{pq}$—that is, cells capable of being simultaneously activated or deactivated via a same control electrode. In the shown example, each group of 1 connected cells $89_{pq}$ of a same extraction device $87_p$ has its cells regularly distributed all along the length of the corresponding guide. More particularly, in the shown example, in each extraction device $87_p$, each group of 1 connected cells of index j (with j ranging from 1 to M) comprises cells $89_{pj}$, $89_{pj+1}$, . . . , $89_{pj+t*1}$, t being an integer such that j+t*1≤1*M. In the shown example, projection device 80 comprises M control terminals $E_j$, each terminal $E_j$ being connected to electrodes $91_j$, $91_{j+1}$, . . . , $91_{j+t*1}$.

Projection device 80 operates as follows. To display a pixel of coordinates i, j of the image, laser source $93_i$ is turned on at the desired intensity for this pixel, and control terminal $E_j$ is set to a potential enabling to activate the cells $89_{pq}$ to which it is connected. A group of k*1 extraction cells regularly distributed across the entire surface of device 80 then is in the active state and optically supplied by the same laser source $93_i$. The beams projected by the cells of this group altogether correspond to the displaying of the pixel of coordinates i,j of the image. These beams originating from a same laser source $93_i$ are coherent and may be phase-matched. The cells from the group all substantially have the same projection orientation, selected according to the angle of vision desired for the pixel. The effect described in relation with FIG. 5C of restoring a circular wavefront centered on a point of the retina having its position depending on the angle of vision α desired for the pixel can thus be obtained. As an example, the N laser sources $93_i$ may be simultaneously turned on and the M electrodes $E_j$ may be successively set to the active state to project the image line by line. Preferably, in a same assembly of k extraction devices $87_p$ coupled to a same laser source $93_i$, a single group of k*1 interconnected extraction cells is activated at a time.

Figure 7A:
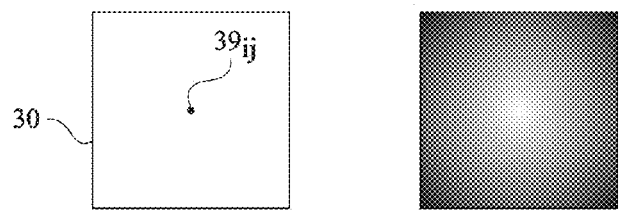
FIGS. 7A to 7C schematically show various configurations of an image projection device and, for each configuration, the perception, for an observer, of the projection of a point-like image.
Figure 7B:
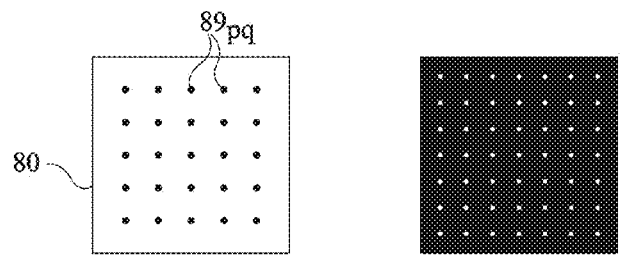
Figure 7C:
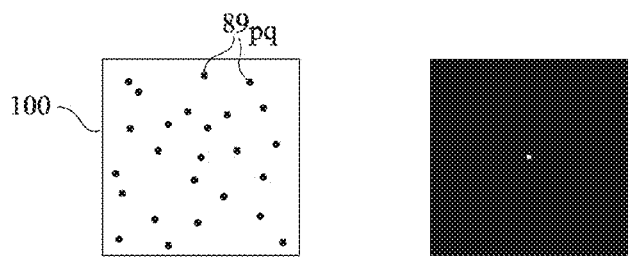

FIGS. 7A to 7C schematically show various configurations of an image projection device and, for each configuration, the perception, for an observer, of the projection of a point-like image.

FIG. 7A illustrates the case of a projection device 30 of the type described in relation with FIG. 2, where the projection of a pixel of the image is performed by a single extraction cell $39_{ij}$. The case where the emission surface area of cell $39_{ij}$ is relatively small, typically smaller than or equal to 5 µm2, is here considered. As appears in the right-hand portion of FIG. 7A, when a point-like image, that is, a single-pixel image, is projected, the user perceives a fuzzy luminous halo spreading on a wide portion of the retina.

FIG. 7B illustrates the case of a projection device 80 of the type described in relation with FIG. 6, where the projection of a pixel of the image is performed by a group of a plurality of extraction cells $89_{pq}$ of same orientation regularly distributed across the entire surface of the projection device, to obtain a multiple-interference focusing effect of the type described in relation with FIG. 5C. The case where the emission surface area of each cell $89_{pq}$ is relatively small, typically smaller than or equal to 5 µm2, is considered. As appears in the right-hand portion of FIG. 7B, when a point image, that is, a single-pixel image, is projected, the user effectively perceives a point, at a position of the retina corresponding to the angle of vision α desired for this pixel. However, as appears in FIG. 7B, the observer further perceives, in addition to this point, a plurality of parasitic points regularly distributed across the surface of the retina. Such a parasitic repetition of the image point results from the periodic distribution of the beams emitted for the displaying of a same image pixel, which results in a resonance effect on the phase matches. This effect can be explained by the notion of decomposition of the circular wavefront (desired inside of the eye) into an angular spectrum. The largest angle of the spectrum sets the width of the focusing point, and the distribution pitch of the spectrum sets the repetition pitch of the pattern projected on the focusing point. According to the angular distribution pitch selected for the spectrum, parasitic resonances may occur on the observer's retina and thus be perceived by the observer, which may raise an issue in certain applications.

FIG. 7C illustrates the case of a projection device 100 similar to device 80 of FIGS. 6 and 7B, where, however, the projection of a pixel of the image is performed by a group of a plurality of interconnected extraction cells $89_{pq}$ irregularly distributed across the surface of the projection device, for example randomly or pseudo-randomly distributed on the surface of the projection device. As previously, the case where the emission surface area of each cell $89_{pq}$ is relatively small, typically smaller than or equal to 5 µm2, is considered. As appears in the right-hand portion of FIG. 7C, when a point-like image, that is, a single-pixel image, is projected, the user effectively perceives a point, at a position of the retina corresponding to the angle of vision α desired for this pixel, and the effect of repetition of this point observed in the configuration of FIG. 7B does not occur. The inventors have indeed observed that when the distribution of the emission regions is irregular, the wavefronts all interfere in phase at the point of convergence of the main axes of the beams on the retina only.

To obtain an irregular distribution of the emission regions corresponding to a same pixel of the image, a first option is to adapt the device of FIG. 6 so that waveguides $82_p$ supplied with light from a same laser source $93_i$, are irregularly distributed along the dimension of the device orthogonal to the guide length, and/or so that, in each extraction device $87_p$, the cells $89_{pq}$ of a same group of cells capable of being simultaneously activated-deactivated by a same control electrode are irregularly distributed along the longitudinal dimension of the guides.

A second option which may be provided in combination with the first option or independently is to provide non-rectilinear waveguides $82_p$, in serpentines of irregular shapes, and/or non-rectilinear electrodes $91_q$, in serpentines of irregular shapes.

Figure 8:
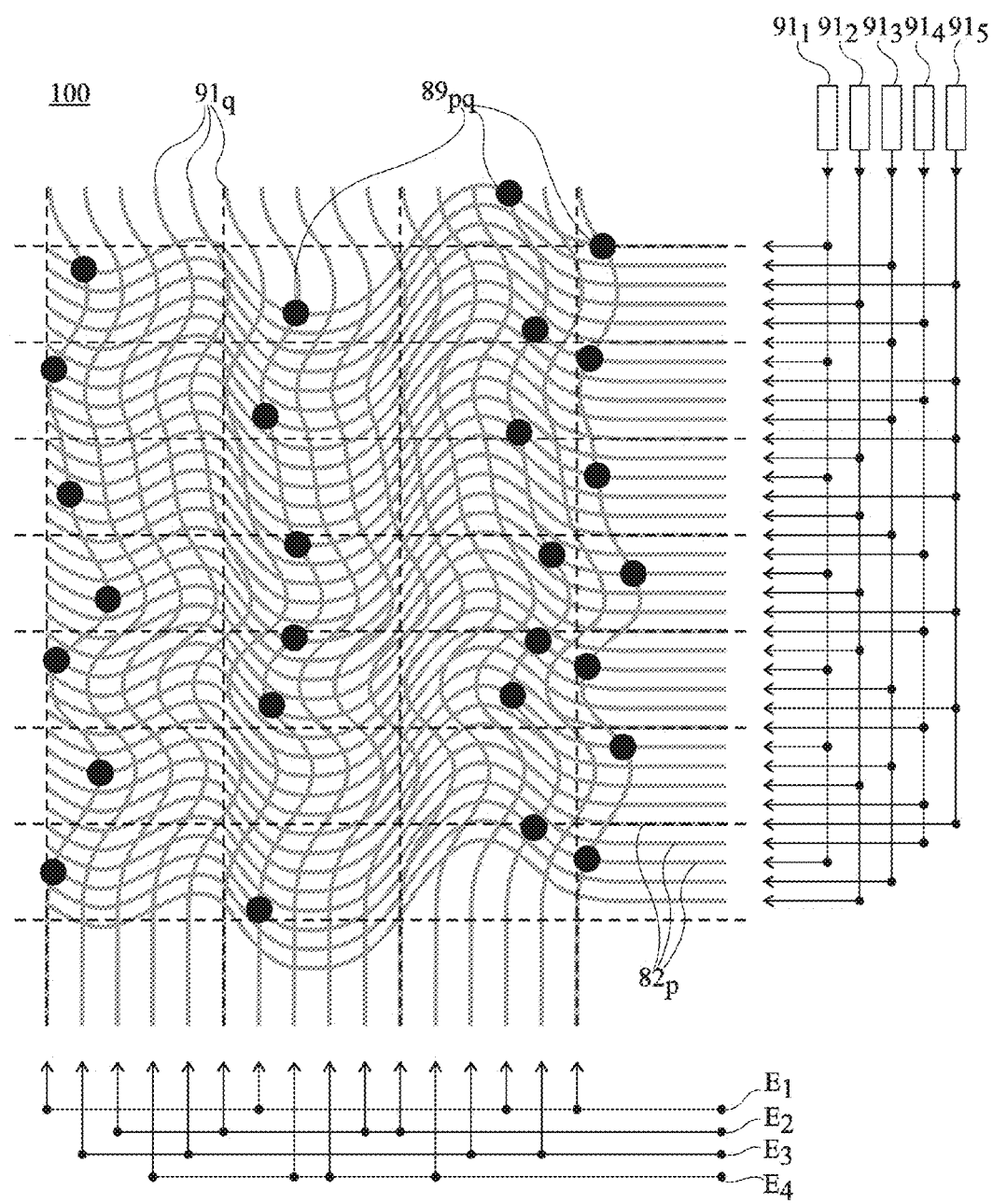
FIG. 8 is an embodiment schematically illustrating an embodiment of an image projection device.

FIG. 8 is a top view schematically illustrating an embodiment of an image projection device 100 of the type described in relation with FIG. 6, adapted based on the first and second above-mentioned options to obtain an irregular distribution of the optically- and electrically-interconnected extraction cells $89_{pq}$ corresponding to a same pixel of the image to be displayed. In the shown non-limiting example, N=5, M=4, k=7, and l=4. In FIG. 8, the 1*k extraction cells $89_{pq}$ used for the display of the pixel of coordinates i=1 and j=1 of the image are shown as black dots.

An advantage of the projection devices shown in relation with FIGS. 2 to 8 is their small bulk, their high light output, and the large number of possibilities that they provide in terms of field of vision and/or of accommodation. It should in particular be noted that in terms of bulk, an advantage of the provided devices is that they may be placed directly in front of a user's eye, with no intermediate optical system and with no beam splitter. Further, the provided devices are compatible with the viewing of a real scene by transparency through the device, particularly due to the transparency of the materials used to manufacture the device. In particular, the diffractive effects of the different optical components (gratings and holograms) are limited for beams originating from the external scene. This is particularly due to the small pitch of the structures (for example, in the order of 400 nm) and to the small involved index differences.

To increase the size of the eye box, that is, the area where the user's eye can displace in front of the projection device while still seeing the entire image, it may be provided to replicate the described structures so that, for each pixel of the image, a plurality of beams or sets of beams of same angular orientation are simultaneously emitted from different areas of the projection device, by different extraction cells. As an example, in the projection device of FIG. 2, to increase the size of the eye box in the longitudinal direction of guides $32_i$, it may be provided to lengthen guides $32_i$ and to replicate once or a plurality of times the structure formed by extraction devices $37_i$ in the longitudinal direction of the guides. To increase the size of the eye box in the transverse direction of guides $32_i$, it may be provided to replicate once or a plurality of times the entire device in the transverse direction of the guides. Similarly, it is possible to increase the size of the eye box in the longitudinal direction of the guides and/or in the transverse direction of the guides in a projection device of the type described in relation with FIGS. 6 and 8 by replicating the described structures on a larger surface area.

Figure 9A:
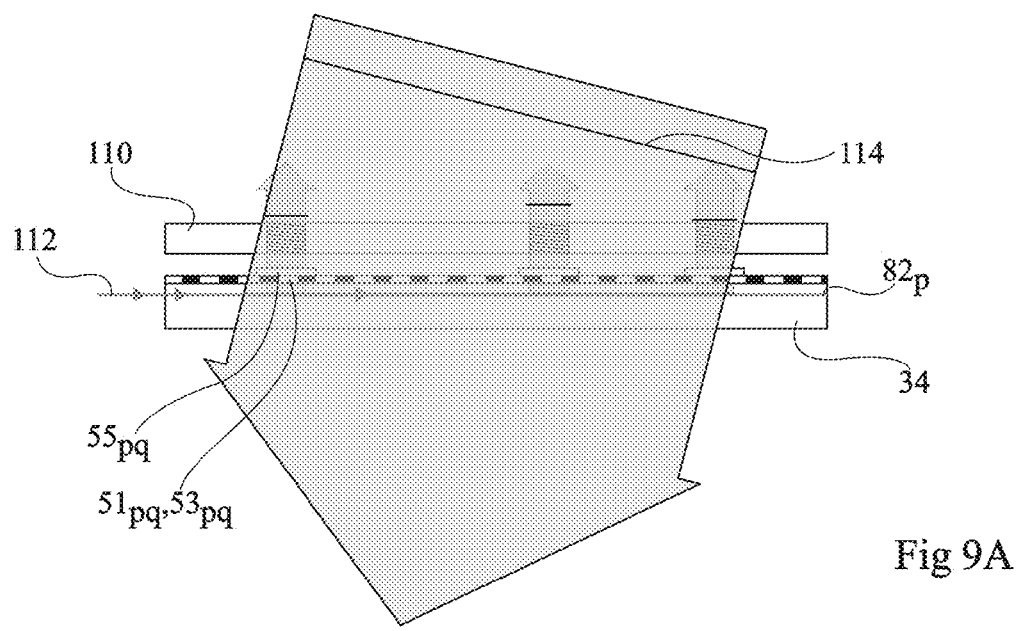
FIGS. 9A and 9B are cross-section views schematically and partially illustrating an example of a method of manufacturing an image projection device.
Figure 9B:
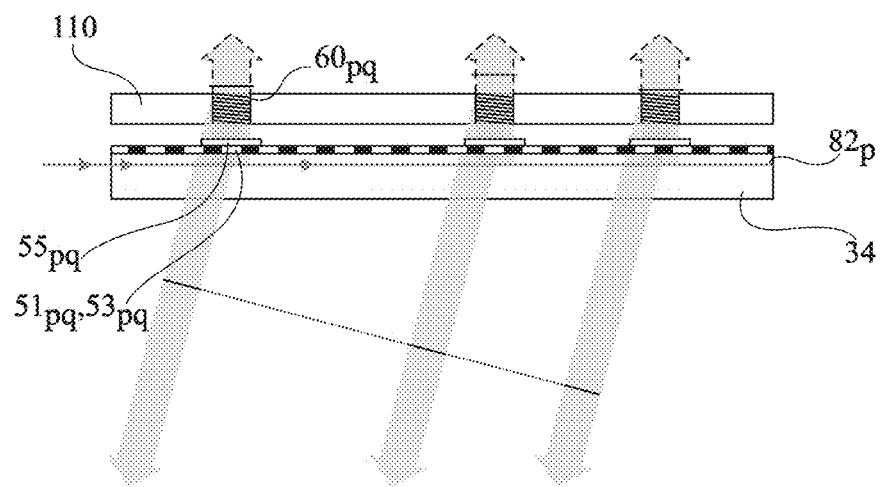

FIGS. 9A and 9B are cross-section views schematically and partially illustrating an example of a method of manufacturing an image projection device of the above-described type. More particularly, FIGS. 9A and 9B illustrates an example of a method of manufacturing holographic orientation elements in a projection device comprising extraction cells of the type described in relation with FIG. 4.

FIG. 9A illustrates a structure comprising, in a transparent substrate 34, one or a plurality of waveguides $82_i$, and, coupled to each waveguide, a plurality of extraction cells $89_{pq}$ each comprising a diffraction grating $51_{pq}$ covered with a layer of variable index $53_{pq}$, and an electrode $55_{pq}$ for controlling layer $53_{pq}$. Above this structure, on the path of the light at the output of diffraction gratings $51_{pq}$, is arranged a layer 110 made of holographic material. In the shown example, layer 110 extends across substantially the entire surface of the projection device. As a variation, the holographic material may be arranged only opposite the emission surfaces of diffraction gratings $51_{pq}$.

To form, in one or a plurality of extraction cells $89_{pq}$, a holographic element $60_{pq}$ having a specific orientation angle, a laser beam emitted by a same source is separated in two paths. A first path 112 is shaped and injected into the waveguide(s) $32_p$ having the cells $89_{pq}$ concerned by this angle coupled thereto. A second path 114 is collimated and extended to substantially cover the entire surface of the projection device. This second path is projected onto layer 110 with the viewing angle desired for the concerned cells. The concerned cells are then electrically activated via their control electrodes, so that diffraction gratings $51_{pq}$ extract the signal in the concerned cells. Opposite each of the optically- and electrically-activated cells, the holographic material of layer 110 records an interference pattern. At the end of this step, as illustrated in FIG. 9B, the exposed portions of layer 110 have the desired orientation properties. These portions form the orientation elements $60_{pq}$ of the concerned cells. Optionally, to avoid exposing the portions of layer 110 which are not concerned by the considered angle, the device may be exposed to beam 114 through a programmable array of micro-minors capable of limiting the extension of beam 114 only to the areas concerned by the angular orientation of beam 114.

The process can be repeated as often as necessary by each time modifying the orientation of beam 114 and the optical and electrical addressing of the active extraction cells, to form the different orientation elements of the projection device.

It should be noted that for a given angular emission orientation of the projection device, if the dimensions of the optical paths between the laser emission source and the different extraction cells concerned by this orientation are not carefully selected, the beams projected at the output of the diffraction gratings of these cells are not phase-matched. An advantage of the manufacturing method described in relation with FIGS. 9A and 9B is that the holographic elements $60_{pq}$ corresponding to a same angular emission orientation will naturally take into account the phase dispersion of the beams at the output of gratings $51_{pq}$. Thus, once the holograms have been recorded, orientation elements $60_{pq}$ will not only result in orienting according to the desired angle the light injected into the device, but also of matching the phase of the different beams simultaneously emitted by the device with a same angular orientation, thus providing a multiple-interference focusing effect of the type described in relation with FIG. 5C.

Specific embodiments have been described. Various alterations, modifications, and improvements will readily occur to those skilled in the art.

In particular, the described embodiments are not limited to the above-mentioned numerical examples, particularly in terms of image size capable of being projected by the provided devices. In practice, devices capable of projecting images comprising from several hundreds to several tens of thousands of pixels. As a variation, the projection device may comprise a single waveguide in the case where an image of a single line of pixels is desired to be projected.

Further, the use of the provided projection devices is not limited to the field of HMD-type augmented reality display devices. In particular, the provided projection devices may be used to display images for a user without for these images to be meant to be superimposed to a real scene. In this case, it is not necessary for the projection device to be transparent.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed:

1. An image projection device comprising:
   at least one wave guide formed in a substrate;
   at least one laser emission source of controllable intensity configured to inject into the waveguide a laser beam of constant orientation; and
   at least one extraction device comprising a plurality of extraction cells coupled to different areas of the guide, each cell corresponding to a single pixel of the image and being capable of being electrically activated to extract light from the guide and project this light along a predetermined projection direction,
   wherein different extraction cells have projection directions with different orientations.

2. The device of claim 1, wherein each extraction cell comprises:
   a diffraction grating coating a portion of a surface of the guide;
   a layer having an electrically-controllable refraction index covering the grating; and
   at least one electrode for controlling the refraction index of said layer.

3. The device of claim 2, wherein diffraction gratings of different extraction cells have different pitches or different orientations relative to a longitudinal direction of the guide.

4. The device of claim 2, wherein each extraction cell comprises a holographic element superimposed to the layer of controllable refraction index, capable of orienting, in the projection direction of the cell, light extracted from the guide by the diffraction grating of the cell.

5. The device of claim 4, wherein the diffraction gratings of the different cells have the same pitch and the same orientation relative to a longitudinal direction of the guide.

6. The device of claim 1, comprising a plurality of waveguides formed in the substrate, a plurality of laser emission sources and a plurality of extraction devices, each waveguide being coupled to one of the laser emission sources and to one of the extraction devices.

7. The device of claim 2, wherein the different extraction all have the same number of extraction cells, and wherein the cells of same rank of the different extraction devices have their control electrodes connected, the rank of an extraction cell corresponding to its positioning order, relative to the other cells of the same extraction device, between first and second ends of the guide having the extraction device coupled therewith.

8. The device of claim 6, wherein a plurality of waveguides are optically connected, that is, they are capable of being supplied with light from a same light source.

9. The device of claim 8, wherein a plurality of extraction cells coupled to different optically-connected waveguides have parallel projection directions.

10. The device of claim 1, wherein, in each extraction device, a plurality of extraction cells are electrically connected, these cells having parallel projection directions.

11. The device of claim 1, wherein the extraction cells are irregularly distributed across the surface of the device.

12. The device of claim 1, wherein said laser beam of constant orientation is a beam of rays substantially parallel to the longitudinal direction of the waveguide into which it is injected.

13. The device of claim 1, wherein, in transverse cross-section, the largest dimension of said at least one waveguide is smaller than or equal to 2 μm.

14. The device of claim 1, wherein the emission surface area of each of the extraction cells is smaller than or equal to 5 μm2.

15. An image projection device comprising:
   at least one wave guide formed in a substrate;
   at least one laser emission source of controllable intensity configured to inject into the waveguide a laser beam of constant orientation with respect to the waveguide; and
   at least one extraction device comprising a plurality of extraction cells coupled to different areas of the guide, each cell corresponding to a single pixel of the image and being capable of being electrically activated to extract light from the guide and project this light along a predetermined projection direction,
   wherein different extraction cells have projection directions with different orientations.

16. An image projection device comprising:
   at least one wave guide formed in a substrate;
   at least one laser emission source of controllable intensity configured to inject into the waveguide a laser beam of constant orientation with respect to the waveguide; and
   at least one extraction device comprising a plurality of extraction cells coupled to different areas of the guide, each cell corresponding to a single pixel of the image and being capable of being electrically activated to extract light from the guide and project this light along a predetermined projection direction, wherein different extraction cells have projection directions with different orientations;

wherein each extraction cell comprises: a diffraction grating coating a portion of a surface of the guide, a layer having an electrically-controllable refraction index covering the grating; and at least one electrode for controlling the refraction index of said layer;

wherein diffraction gratings of different extraction cells have different pitches or different orientations relative to a longitudinal direction of the guide.

17. The device of claim 16, wherein each extraction cell comprises a holographic element superimposed to the layer of controllable refraction index, capable of orienting, in the projection direction of the cell, light extracted from the guide by the diffraction grating of the cell.

18. The device of claim 17, wherein the diffraction gratings of the different cells have the same pitch and the same orientation relative to a longitudinal direction of the guide.

19. The device of claim 16, comprising a plurality of waveguides formed in the substrate, a plurality of laser emission sources and a plurality of extraction devices, each waveguide being coupled to one of the laser emission sources and to one of the extraction devices.

20. The device of claim 16, wherein the different extraction all have the same number of extraction cells, and wherein the cells of same rank of the different extraction devices have their control electrodes connected, the rank of an extraction cell corresponding to its positioning order, relative to the other cells of the same extraction device, between first and second ends of the guide having the extraction device coupled therewith.

* * * * *